Patented Apr. 25, 1939

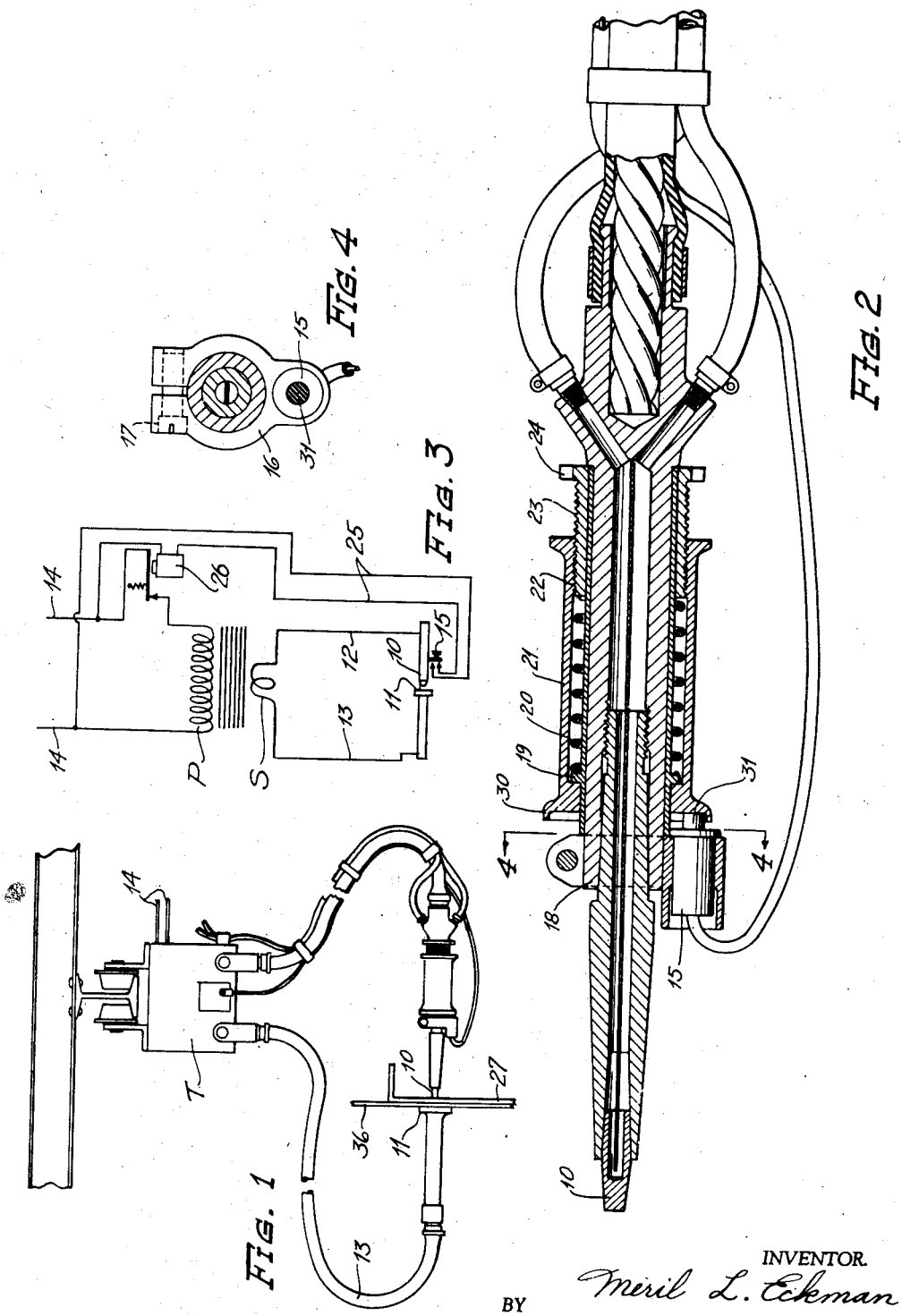

2,155,413

UNITED STATES PATENT OFFICE 2,155,413

WELDING APPARATUS

Meril L. Eckman, Cleveland, Ohio, assignor to The American Coach & Body Company, Cleveland, Ohio, a corporation of Ohio Application April 7, 1937, Serial No. 135,514

6 Claims. (Cl. 219—4)

This invention relates to certain new and useful improvements in welding apparatus, and more particularly to portable welding equipment of the type wherein the electrodes possess a wide range of movement with respect to one another.

Heretofore, in this type of welding equipment, the character or quality of the weld was dependent, to a great degree, upon the operator manually applying the proper pressure or force of one of the electrodes against the work during the welding operation, or during that period when the current is caused to flow through the electrodes.

In recent years the size and weight of electrodes employed in this type of portable welding equipment has been considerably reduced, but they are still of sufficient weight to cause an operator, through fatigue towards the end of a day's work, and without knowledge on his part, to gradually reduce the force or pressure with which he presses the electrode against the work during the welding period.

While this decrease in manual pressure upon the part of the operator, may not be visibly noticeable in the weld affected at the time, the mechanical strength in the united parts is lacking, due to a "cold weld", and the fabricated parts will not meet the stresses to which they are later subjected while in use.

Furthermore, in portable welding apparatus of the type referred to, the operator controls the current flow through the electrodes by a manually operated controller, such controller being operated at any time elected by the operator. It follows, therefore, that should the flow of current to the electrodes be supplied before the proper pressure has been exerted against the electrode, or after such pressure has been reduced, the result would be a weld of poor mechanical strength, or a cold weld having the objections heretofore mentioned.

It is an object of the present invention, therefore, to eliminate the aforesaid objections in connection with present-day portable welding apparatus of the type referred to.

More particularly, it is an object of my invention to provide in a welding apparatus of the class described, an arrangement whereby the operator must press the electrode against the work with sufficient force to produce an acceptable weld before a flow of current can be established.

Further objects and advantages of my invention will be pointed out in the following description taken in connection with the accompanying drawing, in which Fig. 1 shows welding apparatus made in accordance with my invention and as being used for welding together two sheet-metal plates; Fig. 2 is a longitudinal, vertical section of the right-hand electrode shown in Fig. 1, and on a scale larger than that shown in Fig. 1, certain parts appearing in elevation; Fig. 3 represents the wiring diagram; Fig. 4 is a vertical cross-section, taken on the line 4—4 in Fig. 2.

The welding apparatus, illustrating my invention, consists generally of a pair of portable electrodes electrically connected with the leads from the secondary coil of a transformer.

My invention, however, is principally concerned with mechanism carried in part by one of the electrodes and in part by the transformer for controlling the flow of welding current to and from said electrodes, the novel feature of this mechanism residing chiefly in the arrangement of parts requiring an operator to exert sufficient force of the electrode against the work being welded to produce an acceptable weld before the welding circuit can be completed.

Referring now to a detailed description of my invention, and for the present, to Fig. 1, wherein the welding apparatus comprises two electrodes 10 and 11, each of which is electrically connected to a conductor 12 and 13, respectively. Each of these conductors comprises a secondary lead of a transformer, which is indicated in general at T. The conductors are flexible so that each may be moved selectively and independently of the other, and universally with reference to the transformer T.

The primary leads of the transformer are indicated at 14, as extending to a suitable well outlet (not shown) and having sufficient length to allow the necessary travel of the transformer.

The length of the conductors is dependent upon the task for which they are designed to be used, and the location of the transformer with reference to the work is also determined in accordance with the facilities at the place of use, the arrangement shown in Fig. 1 being merely illustrative of one form which the invention takes.

By means of my invention the flow of current from one electrode to the work and thence to the other electrode, is dependent upon an operator applying a predetermined pressure against one of the electrodes, before the welding circuit can be established. One construction which may be used in a highly satisfactory manner to require an operator to exert adequate pressure against the electrode comprises a circuit controller 15 which is mounted upon the electrode carrier 18, and a sleeve 21, which encloses the carrier and is slidably mounted thereon. When an operator has exerted sufficient pressure of the electrode against the work, to effect a weld having the desired mechanical strength, the sleeve moves with reference to the carrier and actuates the controller button 31. The controller may be mounted in and supported by a bracket member 16, which is attached as by screw 17 to the carrier, or main body portion 18 of electrode 10. This controller or switch 15 is normally held open by a spring, and is adapted, when operated, to close the circuit through a relay 26, which in turn closes the circuit controlling the flow of welding current to the electrodes 10 and 11. The conductors for the switch or controller 15 are shown at 25, as being carried by or supported adjacent one of the secondary leads from the transformer T. Electrode 10 is carried by the main body portion of electrode carrier 18, which carrier is electrically connected to the free end of conductor 12, as clearly shown in Fig. 2. This body or electrode carrier 18 is supplied with an outwardly extending annular rib 19, which normally serves as a stop for the sleeve 21, and against which one end of the spring 20 seats.

The sleeve 21 is normally held against the annular rib 19, by the spring 20, which encircles the electrode carrier 18, one end of the spring seating against said rib, and the other end contacting the inner end of adjustment collar 24. The arrangement is such that spring 20 is located between the electrode carrier 18 and the sleeve 21, thus being concealed from view and retained therein by the collar 24. This collar has an external thread 23, which is received by internal thread 22 of the sleeve 21. The forward or lefthand end of sleeve 21 (Fig. 2) is enlarged preferably to provide an integrally-formed skirt or flange 30, the purpose of which is to cover and conceal the controller button 31. This prevents an operator from manually operating the controller 15, and requires a relative movement between the sleeve 21 and the electrode carrier 18, which is brought about only by exerting the proper amount of pressure on the electrode 10 against the work, before the welding circuit can be completed through actuation of the controller 15.

As heretofore mentioned, various classes of work require different pressures to be exerted upon the electrodes against the work.

Changes in pressure required for actuating the controller 15, may be increased or decreased by rotating the collar 24 in the proper direction,—that is, to increase the tension of the spring 20, the collar 24 may be screwed further into the sleeve 21, and to decrease the pressure of spring 20, the collar 24 may be rotated in the opposite direction. In operating my improved mechanism, an operator merely grasps sleeve 21, and places the electrode 10 against the work to be welded, and then continues to press the sleeve 21 in a direction toward the work. When sufficient pressure has been exerted upon the sleeve 21 in this direction, to obtain an acceptable weld, the tension of spring 20 will be overcome, whereupon the sleeve 21 will move axially upon the outer periphery of electrode carrier 18 in a direction toward electrode 10, thus depressing switch button 31 to close the welding circuit through the relay 24.

Having thus described my invention, it will be readily apparent to those skilled in the art of welding that I have provided an extremely simply, efficient and practical mechanism wherein a predetermined pressure must be exerted against an electrode before the flow of welding current is effected, and by the use of which means it is practically impossible to effect a cold weld or a weld not having the proper mechanical strength for the use intended.

Having thus described the invention, what is claimed as new and desired to be secured by Letters Patent is:

1. In a portable welding apparatus of the type having two electrodes possessing a wide range of movement with respect to one another, means for controlling a source of current applied to said electrodes, comprising in combination a carrier for each electrode, a controller rigidly carried by one of said carriers, a handle member slidably supported by said electrode carrier, resilient means disposed between said handle and said carrier, conductors leading from said controller to said source of current supply, said controller being actuated to close the circuit of said source of current when relative movement takes place between said handle and said electrode carrier.

2. In a welding apparatus, a portable electrode having a handle adapted to be grasped by the operator to position the electrode on the work to be welded, the handle being movable on the electrode substantially in the direction of application of electrode pressure on the work, yielding means opposing movement of the handle in said direction, current supplying means including a switch on the electrode, and an operating connection between the handle and switch, which connection operates to close the switch when said yielding means is stressed a predetermined degree, whereby welding current is turned on only when the electrode is in predetermined forcible contact with the work.

3. An electric welding apparatus of the class described, comprising in combination, an electrode, a holder therefor, a handle mounted for axial movement upon the holder, a stop on the holder, means for normally holding said handle against said stop, and a controller carried by the holder for controlling the flow of welding current to said electrode, such controller being actuated only upon relative axial movement between said holder and handle.

4. An electric welding apparatus of the class described, comprising in combination, an electrode, a holder therefor, a handle slidably mounted upon the holder, a stop on the holder, resilient means between said holder and handle for normally holding said handle against said stop, and a controller carried by the holder for controlling the flow of welding current to said electrode, said controller being actuated only upon compression of said resilient means which permits relative movement between said holder and handle.

5. In an electro-welding apparatus, the combination of an electrode, a handle mounted for axial movement thereon, a welding current circuit, a control circuit, a switch in the control circuit, an operating member for the switch mounted on the electrode in the path of travel of the handle, a spring acting on the handle and resiting axial movement thereof toward the free end of the electrode, said handle being inoperative to actuate said member to close the control circuit until sufficient pressure has been exerted against the handle to overcome said spring, and means for adjusting the tension of the spring.

6. In a portable welding apparatus of the type having two electrodes possessing a wide range of movement with respect to one another, means for controlling a source of welding current applied to said electrodes, comprising in combination, a carrier for each electrode, a controller rigidly carried by one of said carriers, a handle member mounted for axial movement upon said last-mentioned carrier, means normally urging the handle in a direction away from the electrode, conductors leading from said controller to said source of current supply, the arrangement of parts being characterized in that the controller is actuated to close the welding circuit to said electrodes only after a predetermined pressure or force is applied to said handle member to move it axially upon said carrier and in axial alignment with said electrodes.

MERIL L. ECKMAN.